United States Patent
Block et al.

(10) Patent No.: US 8,662,217 B2
(45) Date of Patent: Mar. 4, 2014

(54) ADDITIONAL ROLLER IN A FIXED FRAME

(75) Inventors: Wolfgang Block, Wermelskirchen (DE); Günther Hofrichter, Wermelskirchen (DE)

(73) Assignee: TENTE GmbH & Co. KG, Wermelskirchen (DE)

( * ) Notice: Subject to any disclaimer, the term of this patent is extended or adjusted under 35 U.S.C. 154(b) by 955 days.

(21) Appl. No.: 12/224,069

(22) PCT Filed: Feb. 8, 2007

(86) PCT No.: PCT/EP2007/051195
§ 371 (c)(1), (2), (4) Date: Aug. 15, 2008

(87) PCT Pub. No.: WO2007/093549
PCT Pub. Date: Aug. 23, 2007

(65) Prior Publication Data
US 2010/0181122 A1    Jul. 22, 2010

(30) Foreign Application Priority Data

Feb. 17, 2006  (DE) .......................... 10 2006 007 377

(51) Int. Cl.
*B60P 3/42*    (2006.01)
*B60B 39/00*    (2006.01)

(52) U.S. Cl.
USPC .............................................. 180/16; 180/15

(58) Field of Classification Search
USPC ......................................... 180/15, 16; 5/86.1
See application file for complete search history.

(56) References Cited

U.S. PATENT DOCUMENTS

| 5,083,625 | A | | 1/1992 | Bleicher |
| 5,135,063 | A | | 8/1992 | Kropf |
| 5,984,615 | A | * | 11/1999 | Sundseth ................... 414/534 |
| 6,000,486 | A | * | 12/1999 | Romick et al. ................. 180/23 |
| 6,209,670 | B1 | * | 4/2001 | Fernie et al. .................... 180/12 |
| 6,279,927 | B1 | * | 8/2001 | Nishihira et al. ............... 280/43 |
| 6,725,956 | B1 | * | 4/2004 | Lemire ........................... 180/15 |
| 6,752,224 | B2 | | 6/2004 | Hopper et al. |
| 6,772,850 | B1 | | 8/2004 | Waters et al. |
| 6,880,661 | B1 | * | 4/2005 | Oh ................................. 180/205 |
| 6,902,019 | B2 | * | 6/2005 | Heimbrock et al. ....... 180/65.51 |
| 7,419,019 | B1 | * | 9/2008 | White et al. ................. 180/19.3 |

(Continued)

FOREIGN PATENT DOCUMENTS

| CA | 2 010 543 | 9/1990 |
| CA | 2 457 182 | 11/2004 |

(Continued)

OTHER PUBLICATIONS

International Search Report.

*Primary Examiner* — Paul N Dickson
*Assistant Examiner* — Daniel Yeagley
(74) *Attorney, Agent, or Firm* — Collard & Roe, P.C.

(57) ABSTRACT

A hospital bed with a chassis and with four rollers arranged on the chassis has at least one further auxiliary roller that can be brought into contact with the floor or that can alternatively be driven. The auxiliary roller is mounted on a rigid frame and, together with the frame, can be raised or lowered relative to the chassis by pivoting. A drive motor is secured on the frame and drives the auxiliary roller. A separate pivot drive is provided for raising and lowering the auxiliary roller. The separate pivot drive is secured entirely on the frame and pivots with the frame.

25 Claims, 6 Drawing Sheets

(56) References Cited

U.S. PATENT DOCUMENTS

| | | | |
|---|---|---|---|
| 7,562,883 B2 * | 7/2009 | Livengood et al. | 280/87.01 |
| 7,721,875 B2 * | 5/2010 | Stegmiller | 198/782 |
| 7,882,582 B2 * | 2/2011 | Kappeler et al. | 5/600 |
| 7,905,304 B2 * | 3/2011 | Adachi | 180/12 |
| 8,109,525 B2 * | 2/2012 | Salus | 280/43 |
| 2002/0088055 A1 * | 7/2002 | Vogel et al. | 5/600 |
| 2005/0189155 A1 * | 9/2005 | Bender et al. | 180/15 |
| 2007/0245488 A1 * | 10/2007 | Zimbalista et al. | 5/86.1 |

FOREIGN PATENT DOCUMENTS

| | | | |
|---|---|---|---|
| DE | 101 20 316 | 8/2002 | |
| DE | 10120316 C1 * | 8/2002 | A47C 19/04 |
| FR | 2 735 019 | 12/1996 | |
| WO | WO 01/19313 | 3/2001 | |

* cited by examiner

US 8,662,217 B2

ADDITIONAL ROLLER IN A FIXED FRAME

CROSS REFERENCE TO RELATED APPLICATIONS

This application is the National Stage of PCT/EP2007/051195 filed on Feb. 8, 2007, which claims priority under 35 U.S.C. §119 of German Application No. 10 2006 007 377.0 filed on Feb. 17, 2006. The international application under PCT article 21(2) was not published in English.

The invention relates to a hospital bed having a chassis, having four casters fitted to the chassis, and at least one further, optionally drivable auxiliary roller which can be brought into contact with the floor, it being the case that the auxiliary roller is mounted on a rigid frame and can be raised or lowered, together with the frame, relative to the chassis by pivoting, and that, furthermore, a drive motor, which is secured to the frame, is provided for the auxiliary roller, and a separate pivoting drive is provided for raising and lowering the auxiliary roller.

A hospital bed of the generic type is already known from CA 2457182 A1. The auxiliary roller is accommodated in a housing which is connected in a pivotable manner to the chassis. Acting at the free end of the housing is a separate pivoting drive, which is connected in a pivotable manner to the chassis.

A hospital bed of the generic type is also already known from U.S. Pat. No. 6,772,850 B1. The auxiliary roller and the drive motor are accommodated by a housing which is fitted at one end of a leaf spring. The other end of the leaf spring is connected to the chassis. The leaf spring forces the auxiliary roller in the direction of the floor. In order for the auxiliary roller to be spaced apart from the floor, there is provided a mechanism which acts on the leaf spring at an end which projects beyond the housing, and biases this leaf spring. The mechanism is fixed to the chassis. If the mechanism releases the leaf spring, then the auxiliary roller is displaced in the direction of the floor.

Furthermore, in respect of corresponding hospital beds, reference is also made to CA 2010543 A, DE 10120316 C1, FR 2735019 A1, U.S. Pat. Nos. 5,083,625 A, 6,725,956 B1, 6,752,224 B2 and WO 01/19313 A1. U.S. Pat. No. 5,135,063 A discloses a motor-drivable auxiliary roller for a wheelchair.

It is an object of the invention to provide an advantageous configuration of a hospital bed of the generic type as set out in the introduction.

This object is achieved first and foremost in the case of a hospital bed having the features of Claim 1, this being based on the fact that the separate pivoting drive is secured, in its entirety, to the frame and pivots along with the frame.

As a result of such a configuration, the pivoting drive, the auxiliary roller and the drive motor, together with the frame, form a unit. The frame thus also fully absorbs the weight of the pivoting drive. All that is still necessary, in principle, is a pivoting articulation, in respect of the frame, relative to the chassis. The unit as a whole can be fitted extremely straightforwardly to a chassis of a hospital bed. This makes it possible, within the context of preassembly in the workshop, for the pivoting drive, specifically an eccentric, as will also be described in detail hereinbelow, to be already aligned in relation to the auxiliary roller. The unit comprising the frame, drive motor and auxiliary roller is also advantageous in respect of updating existing hospital beds with such an auxiliary roller. Irrespective of this, or in addition, the compact construction is advantageous, as is also the fact that there is a concentration of weight. This can also contribute to the stability of the hospital bed.

The subject matters of the rest of the claims are explained hereinbelow in relation to the subject matter of Claim 1, but may also be important in their independent formulation.

It thus proves to be advantageous if the pivoting drive uses an eccentric to move the frame relative to the chassis, on which the eccentric is also supported. Only contacting interaction with the chassis is necessary in this respect, but for example no articulated connection. Rather, as has yet to be explained, this can be realized irrespective thereof. In addition, the number of movable parts is advantageously reduced. The eccentric may be formed by an eccentric disk fixed to the shaft. The rotary movement for the eccentric is generated by the pivoting drive. If the arrangement is provided such that the axes of the pivoting drive and of the eccentric cross one another, a gear mechanism is necessary in order to transmit the motive power from the pivoting drive to the eccentric. It is preferred, however, if the axes or shafts are parallel or aligned. A drive shaft of the pivoting drive, for this purpose, may advantageously carry the already mentioned eccentric disk directly.

As long as the eccentric is supported on the chassis, this also provides a (constant) stop in respect of a floor-contact position of the auxiliary roller. This provides comparatively rigid interaction (in the pressure-exerting direction of the auxiliary roller) between the auxiliary roller and the chassis, as is the case anyway in respect of the conventional rollers in such a hospital bed. On the other hand, supporting the auxiliary roller only on the chassis of the hospital bed by way of the eccentric can also be utilized to the effect that, in the floor-contact position, the eccentric butts against the chassis not directly, but by way of a compensating part. Such a compensating part may, further preferably, be a spring part, which is appropriately supported, on the one hand, on the chassis and, on the other hand, on the auxiliary roller, or specifically on the eccentric. A suitable spring in this respect is a compression spring which biases the frame (in its entirety) into the lowered position. This compression spring then acts like a shock absorber when the auxiliary roller is lowered and is in contact with the floor. The contact of the auxiliary roller with the floor is also ensured when the hospital bed is moving quickly and over uneven ground.

At the same time, corresponding unevenesses in the floor are compensated for by the spring without there being any need, for example, for adjustment of the eccentric or for compensation by a gear mechanism.

It is further preferably provided that the abovementioned compression spring acts on the eccentric by way of a pressure-exerting lever fitted on a chassis-mounted pin. The pressure-exerting lever can pivot about the same pin as the auxiliary roller. This is usually also the same pin as secures the frame in a pivotable manner to the chassis.

The direct interaction with the eccentric can be realized by means of the pressure-exerting lever. It is not necessary for the spring to butt directly against the eccentric. In order to provide for advantageous loading in respect of the necessary relative movements between the pressure-exerting lever and the eccentric, a roller, for example in the manner of a ball-bearing race, may be provided on the pressure-exerting lever or, if appropriate, also on the eccentric. This results in advantageous roller transmission during movement.

However, it is not just the case that the eccentric interacts with the chassis via the spring, because this would mean that the frame was always in the lowered position. Rather, for raising and lowering purposes, fixed support of the eccentric relative to the chassis is also necessary, at least in respect of a certain subregion of the lowering or raising displacement path. Provided for this purpose is a supporting arm, with which—offset circumferentially, as far as the eccentric is concerned, in relation to the interaction between the above-described pressure-exerting lever and the eccentric (if the pressure-exerting lever is provided)—the eccentric likewise interacts. It is also recommended in respect of the supporting arm to realize a rolling movement, by the ball-bearing-like formation already described in conjunction with the pressure-exerting lever.

The supporting arm forms the already mentioned stop for the eccentric.

Also preferably provided is a mounting plate, to which the frame is pivotably connected, the mounting plate being firstly fixed to the chassis of the hospital bed. The abovementioned supporting arm is also preferably part of the mounting plate. Articulation (pivot bearing) or support of the eccentric, if appropriate also by way of the abovedescribed compression spring, thus only takes place relative to a part which can readily be incorporated into the subassembly comprising the frame with the auxiliary roller and pivoting drive. The mounting plate alone is to be fixed to the chassis. The frame is connected—only—in a pivotable manner to the mounting plate.

Correspondingly, the operation of upgrading a hospital bed with the auxiliary roller is further simplified to a decisive extent by the mounting plate. All that is required is, for example, for the bores for securing the mounting plate to be made in the chassis of the hospital bed.

In respect of the frame itself, it is preferably provided that it comprises two opposite frame walls, along the longitudinal extent of which the shafts of the auxiliary roller and of the eccentric are mounted one after the other. It may further be provided that, in addition to being connected by the abovementioned shafts, the frame walls are also connected to one another by means of a transverse connection which serves only for stiffening purposes. The auxiliary roller, the eccentric, the pivoting drive, the pressure-exerting lever with the spring, and the supporting arm are accommodated between the frame walls. The frame walls advantageously protect these components against external influences.

An additional transverse connection, as has been mentioned, is preferably provided to the effect that it serves to obtain a measured value which allows which (lowered) position the auxiliary roller is in to be determined. For this purpose, for example an inductive proximity switch may be provided on the supporting arm, and this switch registers the distance between this strut formation and the supporting arm. The supporting arm is fixed, while the transverse connection moves together with the frame during a lowering or raising movement. For this purpose, the transverse connection may comprise, for example, a straightforward sheet-metal strip, since the absorption of forces is not critical.

It is also the case that the pivoting drive for the eccentric is preferably disposed, in its entirety, between the frame walls. In contrast, a drive motor and/or a gear mechanism for the auxiliary roller may be disposed on the outside of one of the frame walls. It is advantageous here, on balance, if the drive motor is readily accessible. Since, furthermore, the drive motor for the auxiliary roller is in any case significantly larger than, for example, the drive motor for the pivoting drive, there would otherwise be a considerable amount of empty space between the frame walls.

The auxiliary roller may be a non-pivoting roller, the running surface of which is of comparatively soft configuration (for example made of soft rubber, in order to achieve good traction). The diameter of the auxiliary roller is preferably equal to, or less than, the diameter of the other, conventional casters fitted to the chassis of the hospital bed. The gear mechanism which is preferably connected between the auxiliary roller and the drive motor for the auxiliary roller is, further preferably, formed such that it does not have any self-locking function, that is to say it has only the lowest possible coefficient of friction. This is advantageous to the effect that, even if the motor fails or, for example, if the motor, for relatively short distances, should not be switched on, the hospital bed can advantageously be easily moved even when the auxiliary roller is lowered. The auxiliary roller has, in this sense, a freewheeling capability.

In order to supply the drive motor and the pivoting drive with electric current, it is preferably provided that there is a corresponding connection to a usually already existing battery in the hospital bed. For example for the purpose of adjusting head parts and/or foot parts of the bed, electric drives are usually already present in the hospital bed, and these can be supplied via a battery. For control purposes, that is to say, in particular, activation and deactivation of the auxiliary roller and/or for lowering and raising the auxiliary roller, corresponding switches and a control unit are then preferably provided on the hospital bed. The switch may be a pushbutton, which has to be actuated for the entire time during which the assistance of the auxiliary roller is required. This brings with it the advantage of reliable actuation. Upon actuation of the pushbutton, the auxiliary roller can on the one hand pivot, by means of the pivoting drive, out of the release position into the floor-contact position and, on the other hand, the drive motor can drive the auxiliary roller.

This described sequence can be stored, for example, in a control means of the control unit. Furthermore, in particular as an addition, it is also preferred for the auxiliary roller to be controlled in drive terms, by means of the control unit, so as to realize slow acceleration. This is intended to make smooth start of the hospital bed possible. In a further preferred configuration of the control means, it is also provided that the drive motor of the auxiliary roller switches off of its own accord when the energy remaining in the battery drops below a certain, predetermined value. In particular, this is also intended to ensure that the remaining energy is sufficient for the auxiliary roller to be displaced into the release position by means of the pivoting drive.

In order to detect the position of the auxiliary roller, an appropriate detection mechanism may be provided. An example of a suitable mechanism is an inductive proximity switch, which senses the position of the auxiliary roller relative to the chassis of the hospital bed. In a more specific configuration, it may be provided, for this purpose, that such a proximity switch is fitted on the supporting arm, which projects between the frame walls from the underside of the chassis of the hospital bed. If the frame is then lowered, the distance between the proximity switch, which is fitted on the supporting arm, and a part which pivots along with the frame can be sensed by the proximity switch, and the latter can derive the position of the auxiliary roller therefrom.

The invention will be explained in more detail hereinbelow with reference to the accompanying drawing, which however merely illustrates an exemplary embodiment. In the drawing.

Figure 1:
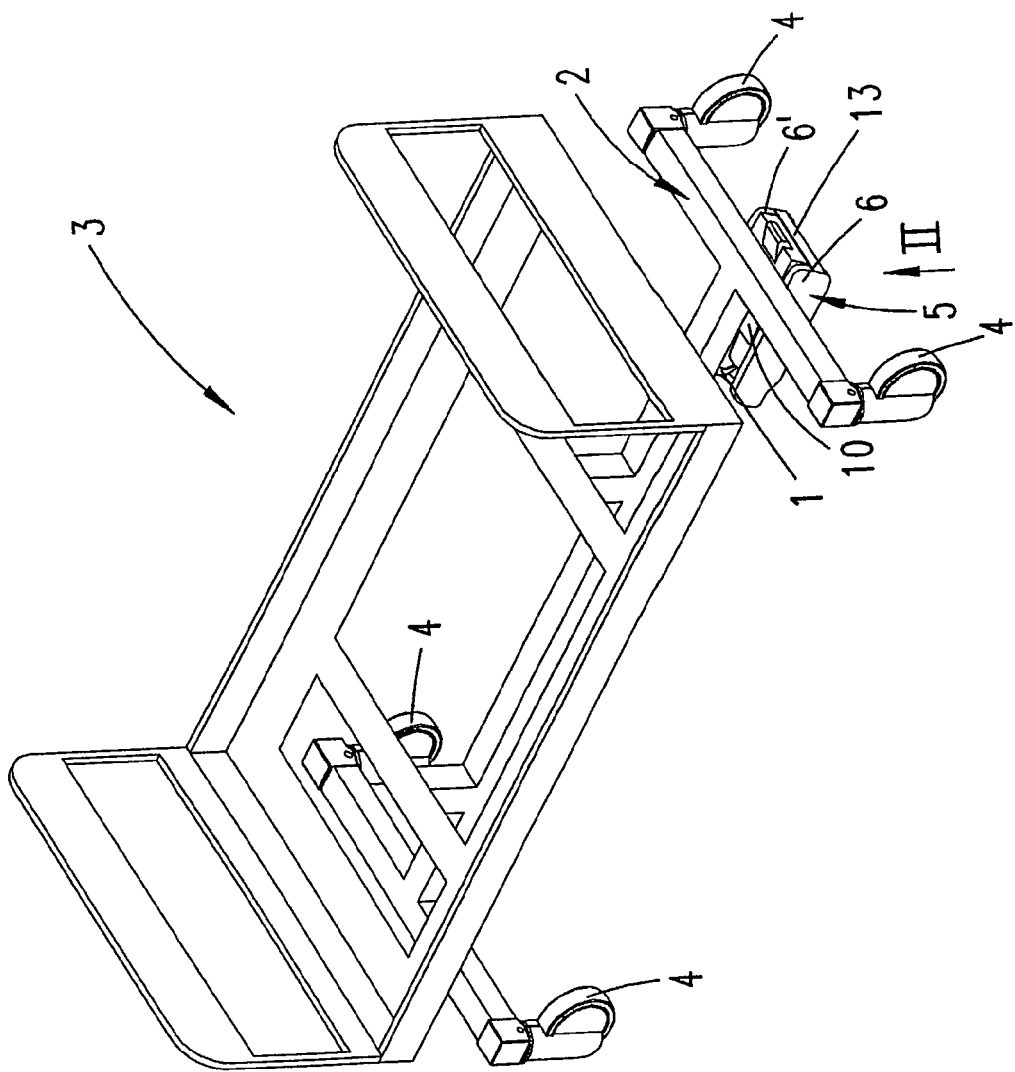
FIG. 1 shows a perspective view of a hospital bed with an auxiliary roller fitted to its chassis, the auxiliary roller being in the release position.

FIG. 1 shows a perspective view of a hospital bed 3 having a chassis 2 and an auxiliary roller 1 disposed thereon, a battery and various operating elements not however being illustrated. The auxiliary roller 1 may be disposed between the casters 4 of the head end or foot end of the hospital bed 3. It is also conceivable, however, for the auxiliary roller 1 to be fixed to the chassis 2 in the center in relation to the four casters 4 respectively disposed at the corners of the chassis 2. The auxiliary roller 1 is preferably oriented in each case such that the running direction of the auxiliary roller 1 runs parallel to the longitudinal extent of the hospital bed 3.

The auxiliary roller 1 is accommodated in a frame 5 which, in the case of the exemplary embodiment, comprises two frame walls 6, 6' disposed parallel to one another. The auxiliary roller 1 is disposed between the frame walls 6, 6'. As can clearly be seen in FIG. 2, the auxiliary roller 1 is disposed off-center, that is to say in closer proximity to the frame wall 6'. This achieves advantageous integration with the rest of the subassemblies yet to be described. The running direction of the auxiliary roller 1 is parallel to the frame walls 6, 6'. The shaft 7 of the auxiliary roller 1 is accommodated, with bearing support, by the frame wall 6, without passing through the latter, and it projects through the frame wall 6', the latter also providing bearing support. The shaft 7 is fixed to the auxiliary roller 1. That end of the shaft 7 which projects out of the frame wall 6' is connected to a gear mechanism 8, via which a drive motor 9 drives the auxiliary roller 1. The gear mechanism 8 and the drive motor 9 are secured to the frame wall 6' from the outside. The drive motor 9 is an electric motor. The gear mechanism 8 is formed such that it does not have any self-locking function and has the lowest possible level of internal friction. This makes it possible to achieve a freewheeling action. In order to supply the drive motor 9 with power, a plug-in connection 35 is provided on the gear mechanism 8.

A mounting plate 10 is provided in addition to the frame walls 6, 6'. In the case of the exemplary embodiment, the mounting plate 10 is disposed between the frame walls 6, 6', regions of which are associated with the underside of the chassis of the hospital bed. The frame 5 is connected in a pivotable manner, by means of a pin 11, to the mounting plate 10 which, in the fitted state, is fixed to the chassis of the hospital bed. In the case of the exemplary embodiment, the pin 11 is screw-connected to the frame walls 6, 6'. The frame walls 6, 6' are connected not just by the pin 11, but also by the shaft 7 of the auxiliary roller 1. The frame 5, furthermore, is provided with transverse connections 12, 13. One transverse connection 12 is disposed in the vicinity of the auxiliary roller 1 and a further transverse connection 13, in the form of an auxiliary metal plate, is disposed in the vicinity of the pin 11. The transverse connection 12 is formed by a bolt which has a reduced-diameter portion 14. The bolt thus forms, as it were, a strut formation between the frame walls 6, 6'. The portion 14 is associated with the auxiliary roller 1. In the case of the exemplary embodiment, the transverse connection 13 is connected by means of screws to the end faces of the frame walls 6, 6'.

In order to fix the mounting plate 10 to the chassis 2 of the hospital bed 3, bores 15 are provided in the mounting plate 10, and these bores have—in the case of the exemplary embodiment—fillister head screws 16 passing through them. The fillister head screws 16 are screwed in corresponding threaded bores 17 in the chassis 2.

Figure 4:
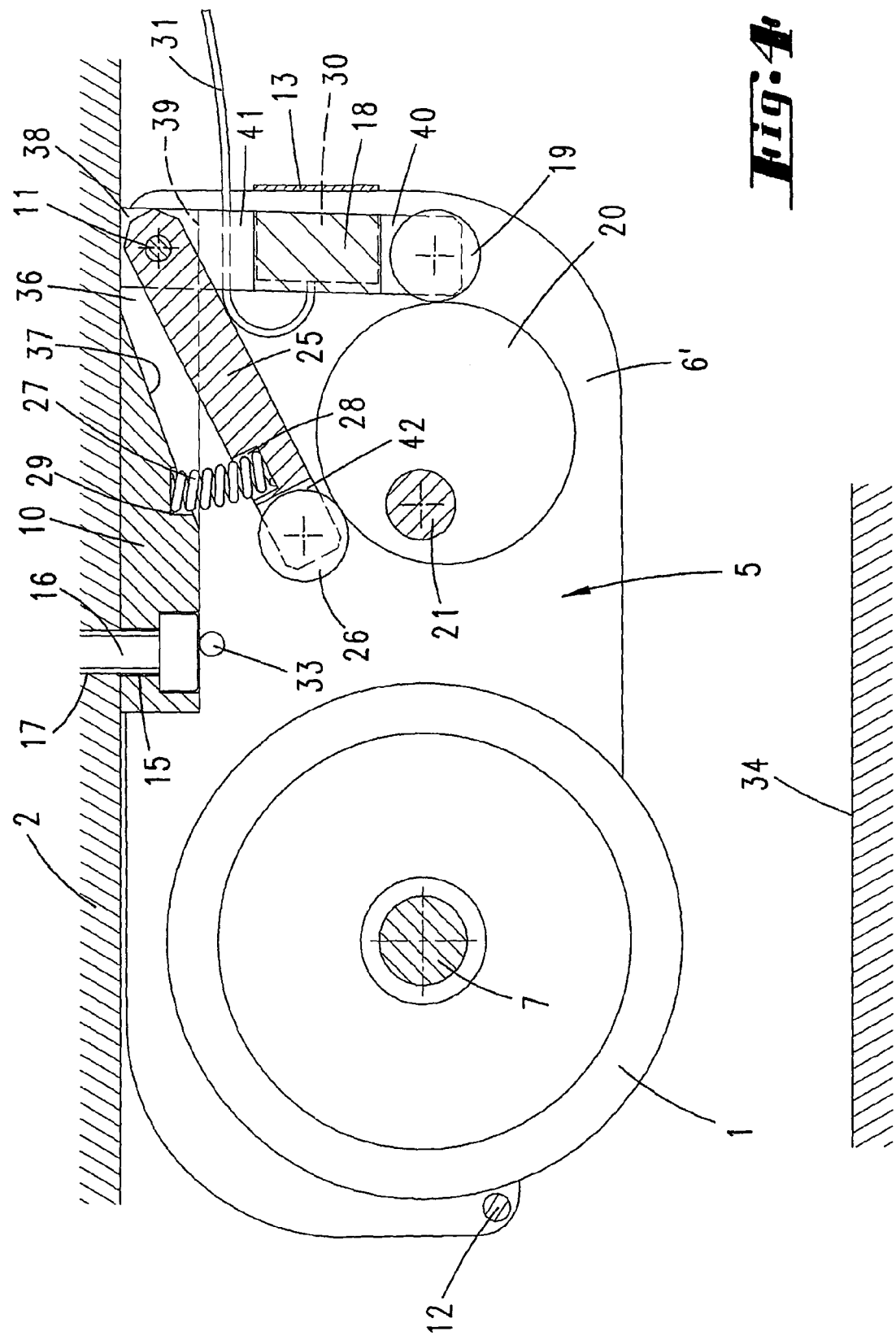
FIG. 4 shows a section along line IV-IV from FIG. 2.
Figure 6:
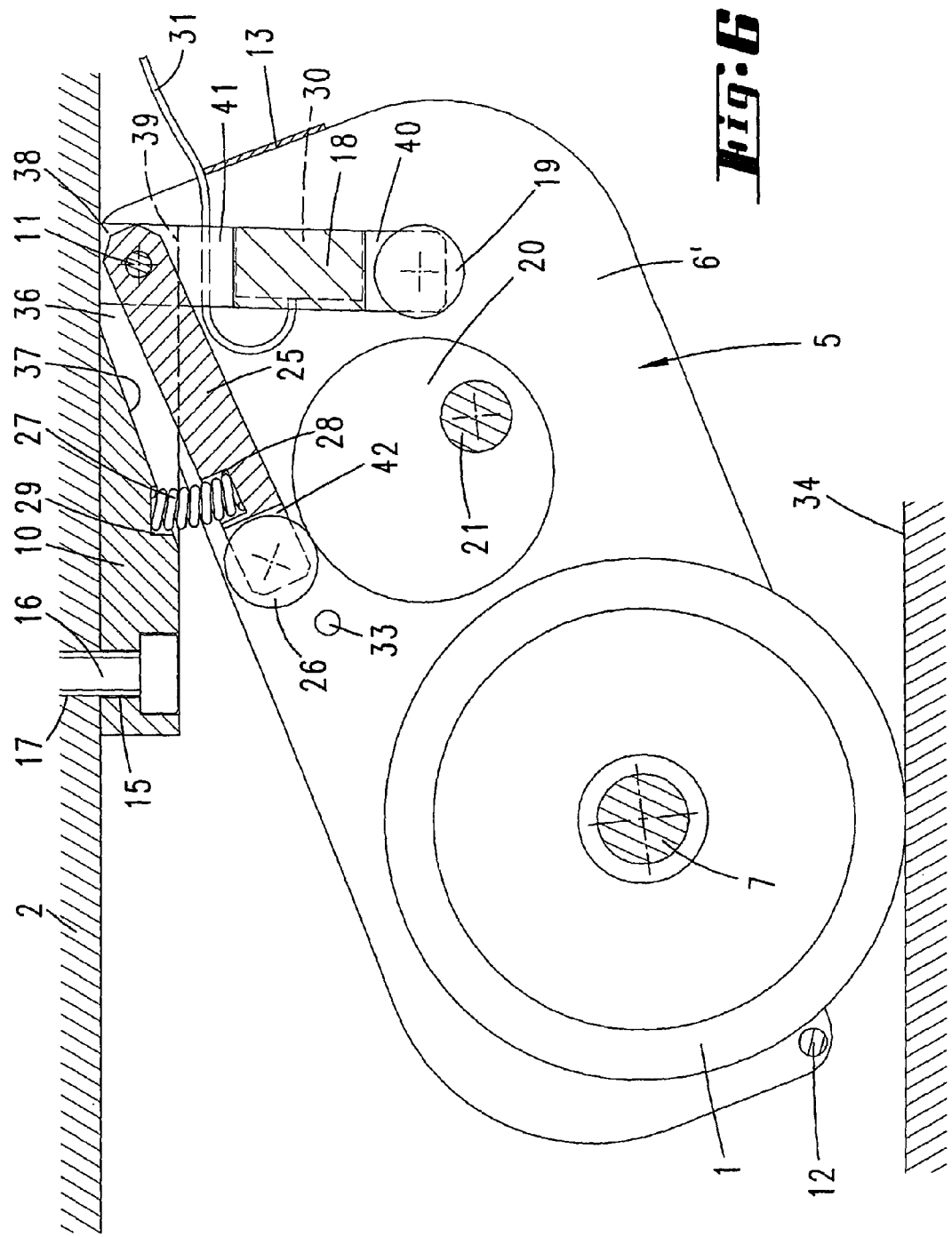
FIG. 6 shows a section corresponding to FIG. 4, but in this case the auxiliary roller is in the floor-contact position.

FIGS. 4 and 6 show a section through a bore 15 with a fillister head screw 16 positioned therein. As is particularly clear from FIGS. 2 and 4, the mounting plate 10 forms an open-edged cutout 36 in the direction of the pin 11. The mounting plate 10 tapers in the region of the open-edged cutout 36 and thus forms an obliquely running cover 37. This cover 37 extends over only part of the cutout 36. In the end region, the cutout 36 passes all the way through the mounting plate 10. The cover 37 is at an angle of approximately 20° in relation to the lying surface of the hospital bed 3. The cutout 36 is disposed centrally in the mounting plate 10 and is approximately half the overall width of the mounting plate 10 (see FIG. 2).

An end portion 38 of a supporting arm 18 extends into the cutout 36. The end portion 38 is adapted in terms of shape to the width of the cutout 36. The basic width of the supporting arm 18 is greater than the width of the cutout 36, and the supporting arm 18 thus provides lateral shoulders 39, which engage against the mounting plate 10. The supporting arm 18 is fixed to the mounting plate 10 by the pin 11. The shoulders 39 help to join the supporting arm 18 fixedly to the mounting plate 10. The supporting arm 18 is angled at approximately 90° to the mounting plate 10 and projects into the interspace between the two frame walls 6, 6'. Disposed at the free end of the supporting arm 18 is an annular body 19, which is rotatable on balls in a manner corresponding to the outer race of a ball bearing. In specific terms, for this purpose, the pin which receives the balls and the annular body 19 is bearingly mounted between two legs 40.

Figure 2:
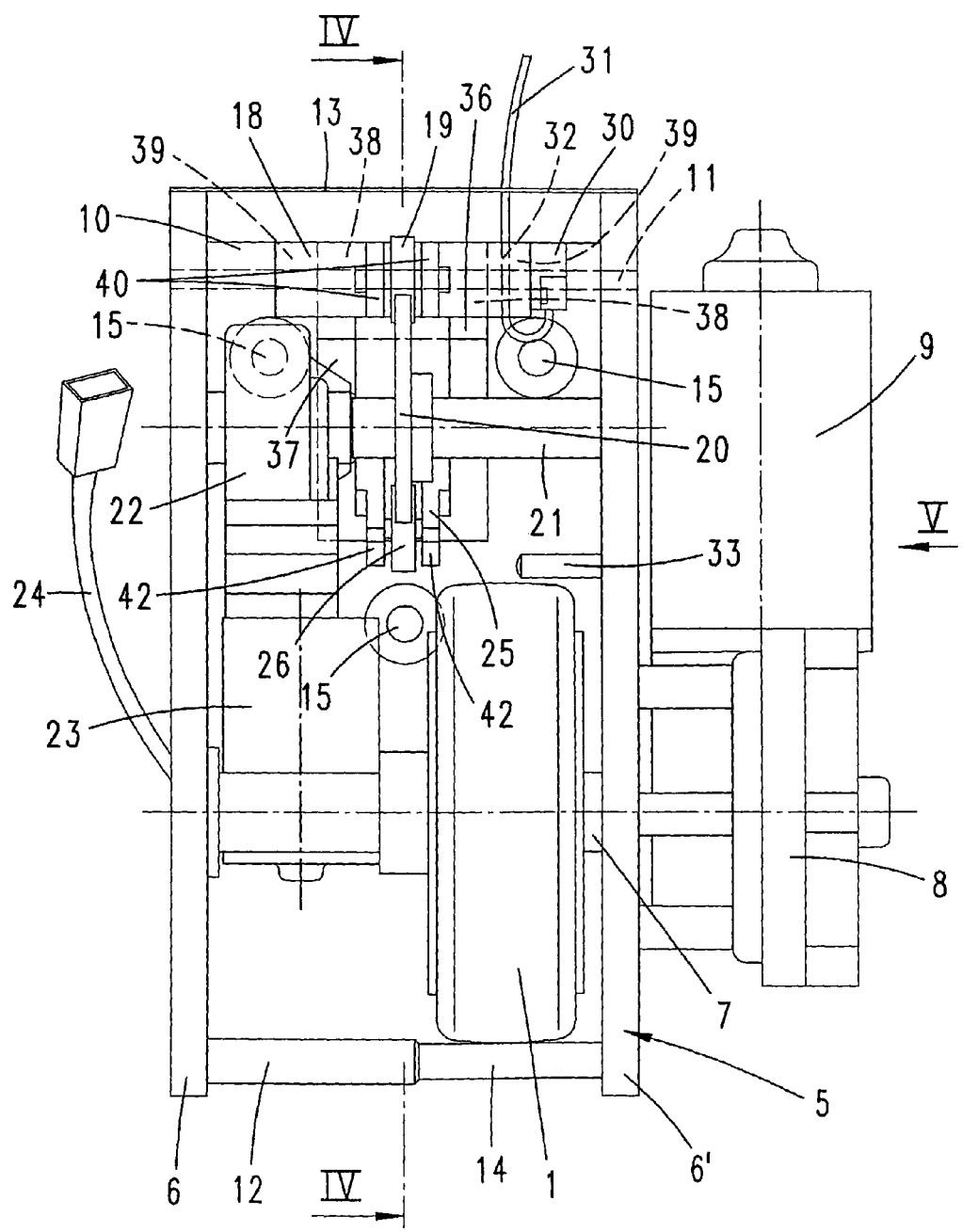
FIG. 2 shows a bottom view of the auxiliary roller as seen in viewing direction II from FIG. 1.

As can be gathered, in particular, from FIG. 2, an eccentric 20 interacts with the annular body 19. The annular body 19 allows rolling in relation to the eccentric 20. The eccentric 20 is disposed on a shaft 21, in the case of the exemplary embodiment centrally, between the frame walls 6, 6'.

It can also be seen in FIG. 2 that the shaft end which is associated with the frame wall 6 is part of a gear mechanism 22. Using the gear mechanism 22, the shaft 21 can be driven by the pivoting drive 23. The pivoting drive 23 and the gear mechanism 22 are secured to the inside of the frame wall 6 and, together, form the pivoting unit for the auxiliary roller 1. The pivoting drive 23 is connected, via a cable 24, to a power source, also by way of an interposed control unit. As can also be gathered from FIG. 2, the pivoting drive 23 runs laterally along the auxiliary roller 1. An advantageous overall size can be achieved for the frame 5 by virtue of the auxiliary roller 1 and the pivoting drive 23 being disposed one beside the other.

Figure 5:
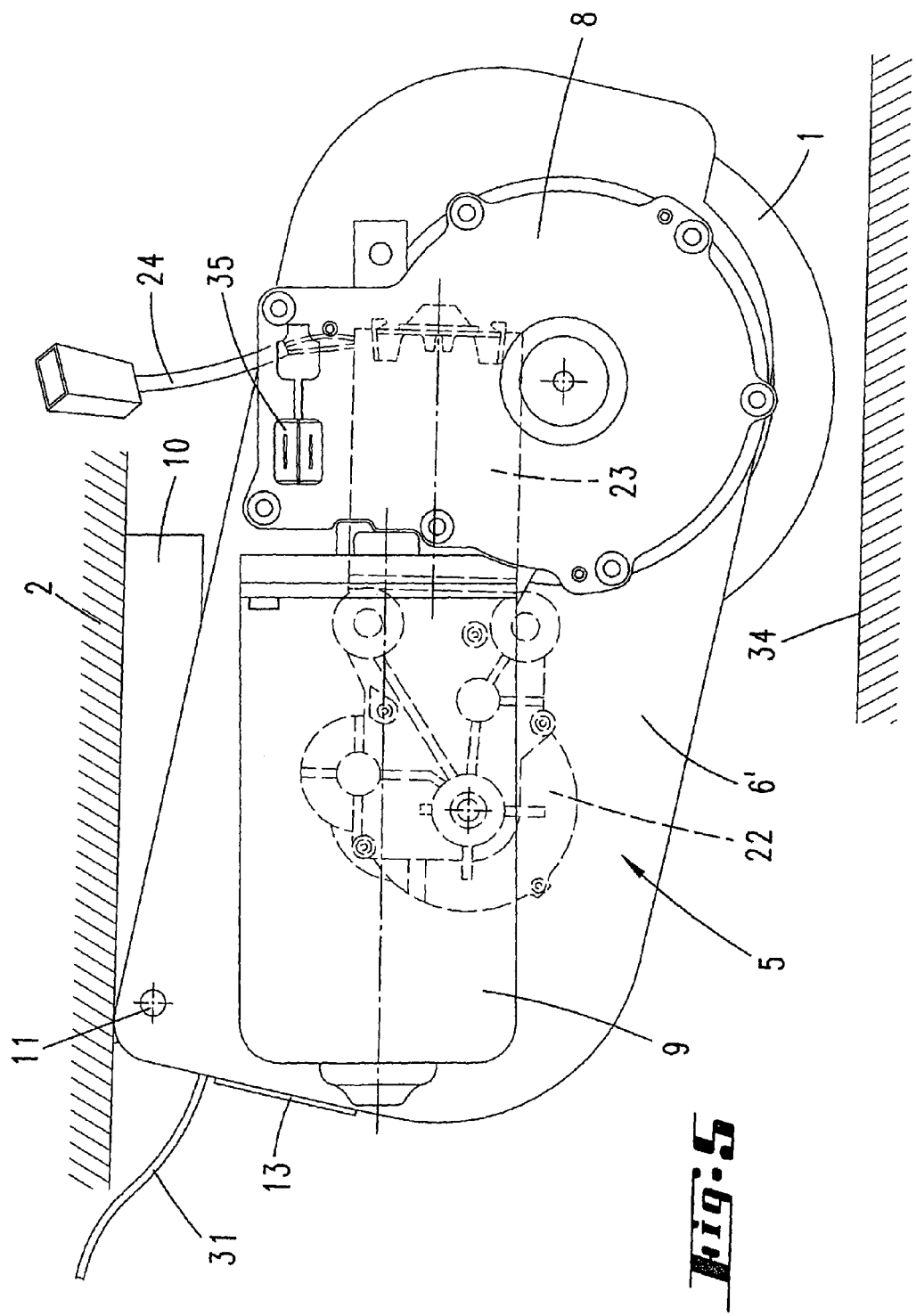
FIG. 5 shows a side view of the auxiliary roller in the intermediate position as seen in viewing direction V from FIG. 2.

As can further be gathered from FIGS. 2 and 5, the two axes of symmetry of the pivoting drive 23 and of the drive motor 9 run approximately parallel to one another. The axes of symmetry of the shaft 7 of the auxiliary roller 1 and the shaft 21 of the eccentric 20 run approximately at right angles to one another (see FIG. 2).

A pressure-exerting lever 25 is provided in addition to the supporting arm 18. The pressure-exerting lever 25 is located directly in the pivoting path of the eccentric 20, or more precisely of the shaft 21, when the frame 5 is pivoted. The pressure-exerting lever 25, which can be pivoted about a pin 11, is supported by a spring 27 which butts, on the one hand, against the chassis of the hospital bed, or specifically, in the case of the exemplary embodiment, against the mounting plate 10, and, on the other hand—by way of the pressure-exerting lever 25 —against the eccentric 20. In the case of the exemplary embodiment, the pressure-exerting lever 25 is also mounted on the supporting arm 18. For this purpose, the supporting arm 18 has, at the chassis end, a cutout 41, and it also has a pin 11, which passes through the foot of the pressure-exerting lever 25. As has also already been explained in respect of the supporting arm 18, the pressure-exerting lever 25 also has, on the eccentric end, an annular body 26. Correspondingly, the annular body 26 is also bearingly mounted by balls (not illustrated), in a manner corresponding to a ball-bearing, at the end of the pressure-exerting lever 25, specifically, again, by a pin between two legs 42 of the pressure-exerting lever 25.

The pressure-exerting lever 25 is forced by the spring 27 in a counterclockwise direction, as seen with reference to FIGS. 4 and 6. Clearly, the pressure-exerting lever 25 thus always butts against the eccentric 20, whereas this need not necessarily be the case for the supporting arm 18, cf. FIG. 6. In this respect, the pressure-exerting lever 25 interacts with the spring 27 in the manner of a shock absorber. The movement of the auxiliary roller 1 on the floor, that is to say in the lowered position, can thus be compensated for and damped (in respect of movements in the vertical direction).

More specifically, one end of the compression spring 27 is accommodated in a receiving cavity 28 in the pressure-exerting lever 25. The other end of the spring 27 is positioned in a receiving cavity 29 in the cover 37 of the cutout 36 in the mounting plate 10.

Figure 3:
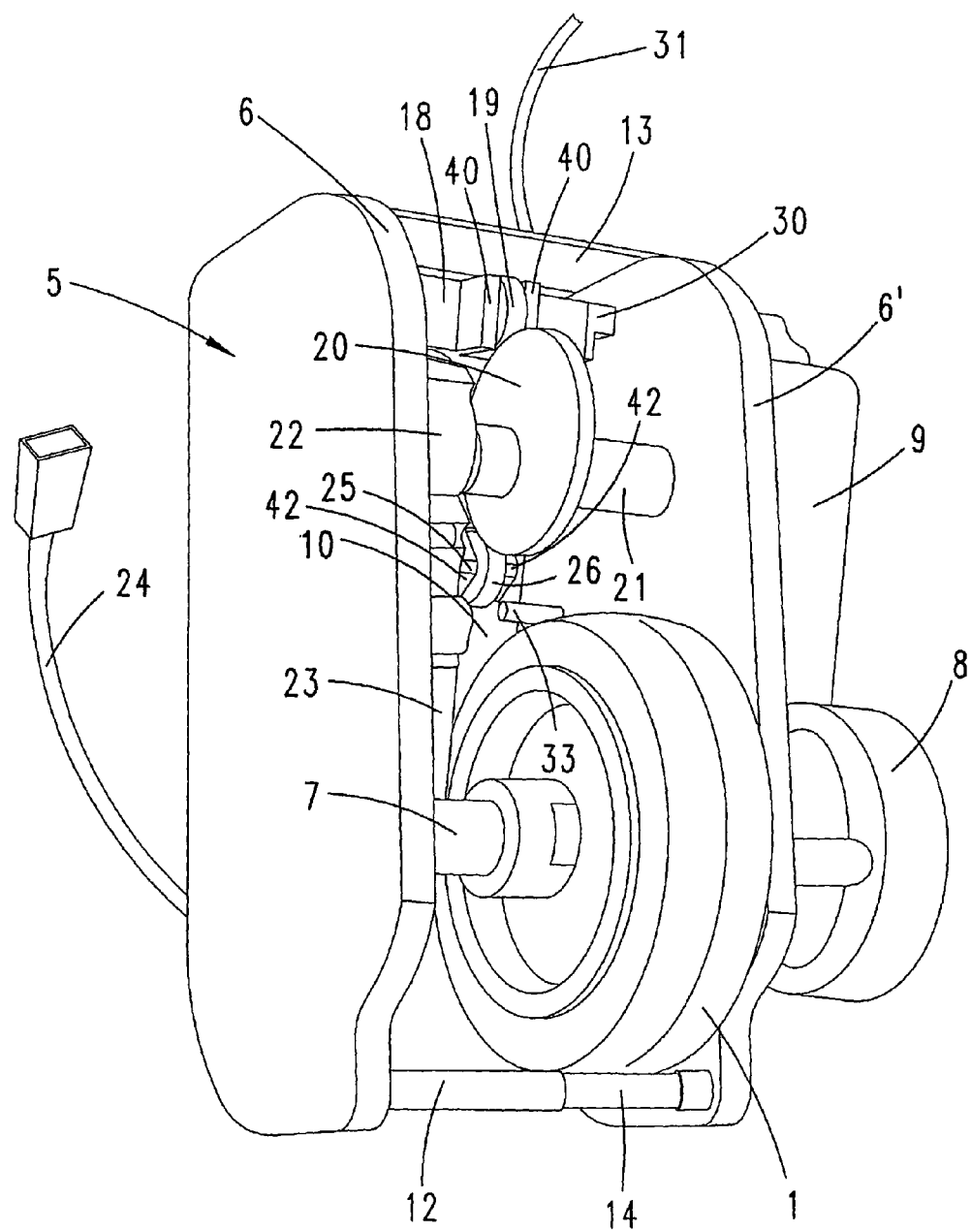
FIG. 3 shows a perspective bottom view of the auxiliary roller.

As can further be gathered from FIGS. 2 and 3, a sensor 30 is disposed laterally on the supporting arm 18. The sensor may be, for example, an inductive proximity switch. A connection cable 31, which is necessary for the sensor 30, is fitted on the auxiliary roller 1 side of the sensor 30. This connection cable 31, furthermore, is routed through a bore 32 running parallel to the mounting plate 10. The sensor 30 is disposed level with the transverse connection 13 (see FIGS. 4 and 6).

As can likewise clearly be seen in FIGS. 2 and 3, a stop pin 33, extending from the frame 6', projects into the interspace between the two frame walls 6, 6'. It can clearly be seen in FIG. 4 that the stop pin 33 prevents the frame 5 from pivoting too far in the clockwise direction. In the release position, the stop pin 33 strikes, by way of its lateral surface, against the surface of the mounting plate 10 and thus limits the pivoting path of the frame 5.

The shafts 7, 21 are preferably accommodated by ball-bearings, which have not been illustrated in the drawings. The ball-bearings here are positioned in receiving bores in the frame walls 6, 6' of the frame 5.

The operation of the auxiliary roller 1 according to the invention will be described in more detail hereinbelow:

In FIGS. 1 to 4, the auxiliary roller 1 is located in the release position. The auxiliary roller 1 is limited in the direction of the release position by the stop pin 33, which strikes against the mounting plate 10. The auxiliary roller 1 is spaced apart from the floor 34.

If the assistance of the auxiliary roller 1 is then required, a directional switch can be used to select the drive direction of the auxiliary roller 1, and then a pushbutton can be used to displace the auxiliary roller 1 into its floor-contact position (FIG. 6). Actuation of the button starts the pivoting drive 23, so that the eccentric 20 is displaced from the position in FIG. 4 into the position in FIG. 6. In FIG. 4 (release position), the greatest-extent region (the spacing between the outer circumference of the eccentric disk and the center point of the eccentric axis) of the eccentric 20 butts against the annular body 19 of the supporting arm 18. The annular body 26 of the pressure-exerting lever 25 butts against the eccentric 20 and is spaced apart here from the axis of symmetry of the shaft 21 by a considerably smaller extent than the annular body 19, to be precise in a circumferential region which is located in the vicinity of, or at an extremely small spacing from, the eccentric axis. FIG. 5 shows an intermediate position. In FIG. 6, the eccentric 20 has been displaced in the counterclockwise direction by means of the pivoting drive 23. In this position (floor-contact position), the greatest-extent region of the eccentric butts against the annular body 26 of the pressure-exerting lever 25. The shaft 21 is then spaced apart from the annular body 19 by a considerably smaller extent, although the eccentric 20 and the annular body 19 are preferably not in contact. The spacing which remains there—and is also illustrated—between the outer circumference of the eccentric 20 and the annular body 19 allows "sprung deflection" of the auxiliary roller 1 if there are unevenesses in the floor. This will be explained in detail hereinbelow. In the floor-contact position, the spring 27 is compressed to a greater extent than in the release position. This achieves a high contact-pressure force between the auxiliary roller 1 and the floor 34. The high contact-pressure force also makes possible good traction of the auxiliary roller 1 on floors which do not provide much grip, for example after cleaning. Starting from FIGS. 4 and 6, the spring 27 and the pressure-exerting lever 25 displace the frame 5, together with the auxiliary roller 1, in the counterclockwise direction about the pin 11. In FIG. 6, the auxiliary roller 1 has been pushed onto the floor 34 by the force of the spring 27. In this floor-contact position, the eccentric 20 is spaced apart by a certain extent from the annular body 19 of the supporting arm 18. This achieves "sprung deflection" of the auxiliary roller 1 such that, if there are unevenesses in the floor 34, the spring 27 can displace the auxiliary roller 1 further in the counterclockwise direction, so that the auxiliary roller 1 is always in contact with the floor. The spring 27 compensates for the unevenesses in the floor 34. Once the auxiliary roller 1 has been displaced into the position according to FIG. 6, the control unit activates the drive motor 9 of the auxiliary roller 1, so that the drive motor can slowly start the auxiliary roller 1. A person who is moving the hospital bed 3 is then assisted, in the task of moving the latter, by the auxiliary roller 1 for as long as the person actuates the push button. If the push button is released, the auxiliary drive provided by the drive motor 9 is deactivated and the pivoting drive displaces the eccentric 20 into the position which has been illustrated in FIG. 4. The eccentric 20 here runs on the annular body 19 and increases the spacing between the axis of the annular body 19 and the axis of the shaft 21. The frame 5 is pivoted about the pin 11 in the direction of the release position.

It is also preferred for assistance by the auxiliary roller 1 to be provided only until a predetermined energy level of the battery has been reached. When this energy level is reached, the control unit switches off the drive motor 9 for the auxiliary roller 1. However, the energy level is still sufficient for the auxiliary roller 1 to be displaced back again, by means of the pivoting drive 23, into its release position. Important functions of the hospital bed 3 are thus maintained.

As can be seen in FIGS. 4 and 6, the different positions of the auxiliary roller 1 also give rise to different spacings between the transverse connection 13 and the supporting arm 18, on which the sensor 30 is also disposed. By virtue of the different spacings, the control unit can derive the position of the auxiliary roller 1 by means of the sensor 30. The transverse connection 13 is displaced in proportion with the displacement of the auxiliary roller 1.

All features disclosed are (in themselves) pertinent to the invention. The disclosure content of the associated/attached priority documents (copy of the prior application) is hereby also included in full in the disclosure of the application, also for the purpose of incorporating features of these documents in claims of the present application.

The invention claimed is:

1. A transporting device having a chassis, having four casters fitted to the chassis, and at least one further auxiliary roller contactable with the floor, wherein the auxiliary roller is mounted on a rigid frame and can be raised or lowered, together with the frame, relative to the chassis by pivoting, and wherein, furthermore, a drive motor secured to the frame is provided for the auxiliary roller, and a separate pivoting drive is provided for raising and lowering the auxiliary roller, wherein the separate pivoting drive is entirely secured to the frame and pivots entirely along with the frame and the auxiliary roller but not with the chassis,
  wherein the separate pivoting drive uses an eccentric to move the frame relative to the chassis,
  wherein the frame comprises two opposite frame walls, and wherein shafts of the auxiliary roller and of the eccentric are mounted one after the other longitudinally along the frame walls, and
  wherein the frame walls are connected to one another by the shafts and by a transverse connection.

2. The transporting device according to claim 1, wherein the eccentric also interacts with a spring having an end supported on the chassis.

3. The transporting device according to claim 2, wherein the spring is a compression spring which biases the frame into the lowered position.

4. The transporting device according to claim 2, wherein the spring acts on the eccentric by way of a pressure-exerting lever articulated on a chassis-mounted pin.

5. The transporting device according to claim 4, wherein the eccentric is supported on the chassis by way of a fixed supporting arm.

6. The transporting device according to claim 5, wherein the supporting arm extends within the frame.

7. The transporting device according to claim 5, further comprising a mounting plate, the frame being pivotably connected to the mounting plate, and the mounting plate being fixed to the chassis so that the frame pivots together with the auxiliary roller and entirely along with the separate pivoting drive but not with the chassis or the mounting plate.

8. The transporting device according to claim 7, wherein the supporting arm is part of the mounting plate.

9. The transporting device according to claim 7, wherein the chassis-mounted pin connects the mounting plate to the frame.

10. The transporting device according to claim 4, wherein the frame is connected by the chassis-mounted pin to the chassis.

11. The transporting device according to claim 1, wherein the separate pivoting drive is disposed between the frame walls.

12. The transporting device according to claim 1, wherein at least one of the drive motor and a gear mechanism for the auxiliary roller is disposed on an outside portion of one of the frame walls.

13. An auxiliary roller device able to be connected to a chassis, the auxiliary roller device comprising:
  (a) a rigid frame;
  (b) an auxiliary roller mounted in said rigid frame, wherein said auxiliary roller is adapted to be brought into contact with a floor, said rigid frame and said auxiliary roller being raisable and lowerable together relative to said chassis by pivoting when said auxiliary roller device is connected to said chassis;
  (c) a drive motor secured on said rigid frame, wherein said drive motor drives said auxiliary roller;
  (d) a separate pivot drive secured entirely on said rigid frame, wherein said separate pivot drive raises and lowers said auxiliary roller, and wherein said separate pivot drive pivots entirely with said rigid frame and the auxiliary roller relative to said chassis when said auxiliary roller device is connected to said chassis;
  (e) a mounting plate pivotably connected to said rigid frame; and
  (f) an eccentric;
  wherein said mounting plate can be fixed to said chassis when said auxiliary roller device is connected to said chassis so that the frame pivots together with the auxiliary roller and entirely along with said separate pivot drive but not with the chassis or the mounting plate;
  wherein said separate pivot drive uses said eccentric to move said rigid frame relative to said chassis when said auxiliary roller device is connected to said chassis;
  wherein said eccentric is supported on said chassis when said auxiliary roller device is connected to said chassis;
  wherein said auxiliary roller comprises an auxiliary roller shaft;
  wherein said eccentric comprises an eccentric shaft;
  wherein said rigid frame comprises a first frame wall and a second frame wall and said second frame wall is located oppositely from said first frame wall; and
  wherein said auxiliary roller shaft and said eccentric shaft are mounted on said first frame wall and said second frame wall one after the other along a longitudinal extent of said first frame wall and of said second frame wall.

14. The auxiliary roller device according to claim 13, further comprising a spring having a first end and a second end;
  wherein said spring can be supported at said first end on said chassis when said auxiliary roller device is connected to said chassis; and
  wherein said eccentric interacts with said spring at said second end of said spring.

15. The auxiliary roller device according to claim 14, wherein said spring is a compression spring; and
  wherein said spring biases said rigid frame into a lowered position when said auxiliary roller device is connected to said chassis.

16. The auxiliary roller device according to claim 15, further comprising a pressure-exerting lever and a pin;
  wherein said spring acts on said eccentric by way of said pressure-exerting lever; and
  wherein said pressure-exerting lever can be articulated on said pin when said pin is mounted on said chassis.

17. The auxiliary roller device according to claim 13, further comprising a fixed supporting arm;
  wherein said eccentric can be supported on said chassis by said fixed supporting arm when said auxiliary roller device is connected to said chassis.

18. The auxiliary roller device according to claim 17, wherein said fixed supporting arm extends within said rigid frame.

19. The auxiliary roller device according to claim 13, wherein said mounting plate comprises a fixed supporting arm.

20. The auxiliary roller device according to claim 13, further comprising a pressure-exerting lever and a pin;
  wherein said pin connects said mounting plate to said rigid frame; and
  wherein said pressure-exerting lever is articulated on said pin.

21. The auxiliary roller device according to claim 13, further comprising a transverse connection, said transverse connection connecting said first frame wall and said second frame wall.

22. The auxiliary roller device according to claim 13, further comprising a pin;
   wherein said rigid frame is connected by said pin to said chassis when said rigid frame and said pin are connected to said chassis.

23. The auxiliary roller device according to claim 13, wherein said separate pivot drive is disposed between said first frame wall and said second frame wall.

24. The auxiliary roller device according to claim 13, further comprising a gear mechanism, said drive motor driving said auxiliary roller via said gear mechanism;
   wherein at least one of said drive motor and said gear mechanism is disposed on an outside of one of said first frame wall and said second frame wall.

25. A transporting device having a chassis, having four casters fitted to the chassis, and at least one further auxiliary roller contactable with the floor, wherein the auxiliary roller is mounted on a rigid frame and can be raised or lowered, together with the frame, relative to the chassis by pivoting, and wherein, furthermore, a drive motor secured to the frame is provided for the auxiliary roller, and a separate pivoting drive is provided for raising and lowering the auxiliary roller, wherein the separate pivoting drive is entirely secured to the frame and pivots entirely along with the frame and the auxiliary roller but not with the chassis,
   wherein the separate pivoting drive uses an eccentric to move the frame relative to the chassis,
   wherein the frame comprises two opposite frame walls, and wherein shafts of the auxiliary roller and of the eccentric are mounted one after the other longitudinally along the frame walls, and
   wherein the separate pivoting drive is disposed between the frame walls.

* * * * *